United States Patent [19]

Tarridec et al.

[11] 3,909,549

[45] Sept. 30, 1975

[54] MULTIFREQUENCY SIGNALLING DEVICE AND PARTICULARLY SIGNALLING RECEIVER THEREOF

[76] Inventors: Andre Tarridec, 21 rue de Trestiniel, Perros-Guirec, France; Jean Leon Marie Joubert, 28, rue de Treguier, Lannion, France

[22] Filed: June 26, 1973

[21] Appl. No.: 373,759

[30] Foreign Application Priority Data

June 27, 1972 France .............................. 72.23909

[52] U.S. Cl. ............................................ 179/84 VF

[51] Int. Cl.² ............................................ H04M 1/50

[58] Field of Search ...... 179/84 VF, 81 R; 307/233, 307/234

[56] References Cited

UNITED STATES PATENTS 3,780,230 12/1973 Bowen et al. ................... 179/84 VF

*Primary Examiner*—Kathleen H. Claffy
*Assistant Examiner*—Joseph Popek
*Attorney, Agent, or Firm*—Laff, Whitesel & Rockman

[57] ABSTRACT

A signalling receiver has a number of selective filters, each selective corresponding to one of the voice frequencies of the signalling plan. Each filter is associated with a detector and a signal envelope detector circuit, and, in turn, these detectors are followed by a shaping circuit for giving the detector a slow rising leading edge wave front and a fast falling trailing edge. The significance of the slow rising wave front is that it tends to limit the signal to the fundamental frequency, as contrasted with a square wave form which tends to have an infinite number of harmonics. The signal received in the signalling receiver is applied either simultaneously with or slightly before the envelope detector circuit. The selective filters have controlled selectivity. The outlet signal from the shaping circuit is applied to the selectivity control means of the filters.

10 Claims, 14 Drawing Figures

MULTIFREQUENCY SIGNALLING DEVICE AND PARTICULARLY SIGNALLING RECEIVER THEREOF

The present invention concerns a multifrequency signaller and more particularly concerns an assembly of transmitters and multifrequency signalling receivers utilised between the exchanges of a telephone network used for establishing telephonic communications between the subscribers.

Systems for signalling with voice frequencies have been known for a long time. These frequencies are located in the voice frequency range that is used for the transmission of speech. These frequencies are intended for conveying control information from one exchange to another. More recently, these systems for signalling with voice frequencies or multifrequency signalling have been utilized between the subscriber stations which are provided with numbered keyboards and the connecting exchanges. In these systems, one has a choice between several codes. There exists, for example, the "4 × 4" code which utilizes two groups of voice frequencies with four frequencies in each group, such as the well-known "Touch Tone" system. Each decimal figure is represented by two frequencies, one forming part of one group and the other of the other group. There likewise exists the "2 among 5" code which utilizes a single group of five voice frequencies, a decimal figure being represented by two frequencies of the group.

In each of these, and similar signalling systems therefore, the transmitting exchange sends control signals representing decimal figures in the form of two frequencies transmitted simultaneously to the signal receiver at the receiving exchange. As in all signal transmissions, the signal received by the receiver comprises not only the transmitted frequencies but also noise and interferences. The receiver of the receiving exchange must therefore discriminate between the signal received as an effective control signal and an interference signal. This discrimination is made by utilizing filters, one for each frequency of the code, followed by detectors. The output signals of the detectors are processed by a logical decision circuit.

In the signal receivers, the signals received are generally amplified and applied in parallel to these filter inlets. Several problems are then presented. First of all, the recognition of a frequency in a complex signal can only be effected after a certain delay time following application of the signal to the filter corresponding to the frequency. The delay avoids possible errors due, for example, to the presence of a train of damped waves originating from a resonant circuit excited by an interference signal or by signal frequencies in the normal voice signal. Then it has been necessary to apply to the filter, a signal having a steep rising wave front because the start of the signal is rich in harmonics, which risks exciting an adjacent filter. This condition is all the more important when selective filters are used. Finally, precisely when selective filters are used, the damping time of these filters is long. The detector which follows the filter may remain excited for a long time after the signal has disappeared. If the transmission speed of the sending signaller is relatively high, there is a risk of overlappping of detection.

A general object of the present invention is to solve, in a simple manner, these three problems of the recognition of a frequency in a voice frequency signal particularly in arranging to use selective filters with controlled selectivity.

In practice, in these signalling systems not only meet the problems of separation of frequencies, but likewise the problems of adjustment of the levels of the signals applied to the filters. In fact, the distance between and the quality of the communication lines or paths between two exchanges may vary to a great extent. In other words, the equivalent of the circuit connecting the transmitter of the starting signal and the receiver of the arrival signal is variable within wide limits. By way of example, in France, these limits may go from − 0.5 to + 2.9 nepers. There is found, therefore, in the signal receiver an amplifier comprising an automatic gain control circuit. It is still necessary to ensure that this amplifier is often preceded by reject filters intended to eliminate certain frequencies such as control frequencies utilized to control the sequences of the transmissions of the control signals. The passage of the leading edge of a complex signal through these rejector filters causes interference resonances. Now an amplifier with automatic gain, control is at its maximum gain in the absence of signal. It will therefore have the tendancy of amplifying these interference signals, due to the rejector filters with a large gain which risks disturbing the operation of the filters mounted behind the last amplifier.

One of the more particular objects of the preferred embodiment of the present invention relates to providing an automatic gain control circuit obviating the above mentioned drawback. The gain of the amplifier increases progressively to the commencement of an applied signal, from a minimum gain value.

As has already been set forth above, the sequence of the transmissions of the control signals by the sending signaller may, in certain cases be controlled by means of an exchange of control information between the sending signaller and the receiving signaller. There exists then a real bilateral connection between the signallers. Among the known exchange systems or servo-systems, may be mentioned that where for the transmission of a control or code signal, the two code frequencies transmitted by the transmitter of the sending signaller remain present on the line while the receiver of the same sending signaller does not detect a signal at the control frequency, originating from the transmitter of the arrival signaller. This detection causes the stopping of the transmission of code frequencies.

In the receiving signaller, the control frequency is transmitted responsive to the recognition of the two code frequencies. Then the transmission of these two signal frequencies is cancelled. The sending signaller may then send the next following two frequency code. It must be noted that if the interconnection between the two signallers is established via a four wire path the transmission of the control frequency by the receive signaller does not disturb the circuits of its own receiver. It is quite otherwise when this path comprises only two wires. A differential transformer or hybrid coil may then be used at the entry of the signaller. However on the one hand, in the differential transformer, the equilibrium is frequently imperfect and, on the other hand, there is a loss of 3dB from the signal.

Another object of the preferred form of the present invention comprises in providing in systems with servo signalisation such as those mentioned above, signallers capable of being connected to a path with two wires without requiring a differential transformer or hybrid coil.

According to one feature of the invention there is provided a signalling receiver with voice frequencies comprising selective filters. Each selective filter corresponds to one of the signalling voice frequencies. Each filter is associated with a detector and an envelope signal detector circuit, followed by a shaping circuit giving detected signal slow rising leading edge. The signal received in the said signalling receiver is applied to the envelope detector circuit either simultaneously or slightly before it is applied to the selective filters. These filters have a controlled selectivity. The outlet signal of the shaping circuit is applied to the control means of the selectivity of the filters.

According to another feature of the invention it is arranged that the said shaping circuit gives the detected signal trailing edge a steep descent.

The means provided according to these two features permit of fulfilling in particular the first object above. In fact it is assumed that, in the absence of signal at the entry of the signaller, the selectivity of the filters is very weak. Therefore the output signal of each filter applied to the detector of code frequency which corresponds to it will be very weak, and the detector will not operate. For its part the envelope detector will send the detected signal to the shaping circuit. This shaping circuit supplies to the selectivity control means a signal having an amplitude which slowly rises in absolute value to a maximum value for which the control means give the filter its maximum selectivity. The result is that the filters will only have maximum selectivity when the input signal is established at quasi continuous operation. It will then have its optimum efficiency. The code frequency detector will operate without error, and only when corresponding code frequency is present in the signal. It will not operate on spurious simulations of the code frequencies. During the whole time of establishing the signal, the selectivity is too weak for the code frequency detector to be started by a short interference or harmonic noise corresponding to the frequency which are to be recognised.

It has already been said that the selective filters remain excited for a long time after the disappearance of the signal. The code frequency detector could then continue to recognise the code frequency for a long time after the disappearance of the signal which prolonged recognition is to be avoided.

According to the invention the amplitude in absolute value of the output signal of the circuit decreases rapidly, to cause the disappearance of the signal. From this the means for controlling selectivity reduces rapidly the selectivity of the filter to its minimum value. The signal applied to the code frequency detector is rapidly cancelled and the detector immediately ceases to recognise the frequency.

According to another feature of the invention, there is provided a signalling receiver with voice frequencies comprising in addition at the entry of the filters an amplifier with an automatic gain control. This amplifier applies signals to the filters with constant level, regardless of the levels of the signals which are applied to them. The envelope detector circuit receives the signal in parallel with the amplifier. The automatic gain control circuit of the amplifier is controlled by the output signal of the said shaping circuit. Thus, the receive circuit responds only once the output signal has reached its maximum amplitude, in absolute value. The gain of the amplifier is minimum in the absence of signal.

According to another feature of the invention, the automatic gain control circuit comprises a variable resistance mounted in parallel at the signal input of the amplifier. The gain value of the amplifier is controlled, on the on hand, by the conventional automatic gain control circuit, as a function of the level of the output, signal of the amplifier and, on the other hand, by the output, signal of the forming circuit.

According to another feature of the invention, the variable resistance is a field effect transistor, the source circuit of which is in parallel with the input terminal of the amplifier and to the gate of which are added the conventional automatic gain control circuit and the output signal of the forming circuit.

According to another feature of the present invention, there is provided a voice frequency signaller comprising a receiver and a transmitter. The input circuit of the receiver comprises a differential amplifier, the inputs of which are respectively connected to two entering wires of the communication path for conveying the voice frequency signals and the output circuit of the transmitter. Two operational amplifiers are current amplifiers, the outputs of which are respectively connected to the two wires leaving the communication path. The signals applied to the two operational amplifiers are in phase opposition.

If the communication path conveying the voice frequency signals have four wires, there is no reaction of the signal applied to the two wires leaving the input of the receiver. If the path has only two wires, ensuring bilatoral connection, the signals applied to the two leaving wires are in phase opposition. They will be added to the output of the differential amplifier placed at the input of the receiver. It is necessary, therefore, to provide adequate reject filters behind the outlet of the differential amplifier.

Another object of the present invention is to provide a signaller which leads to an assembly having a reduced bulk, giving rise only to a small power consumption and having an increased viability, using only action filters and electronic components.

An embodiment of the invention will now be described by way of example, with reference to the accompanying drawings, wherein.

In the description which follows of an embodiment of a signaller, according to the invention, it will be assumed that the signalling system uses voice frequencies in a 2-among-5and that it is a servo system. By way of example, the signaller may use (a) 5 frequencies of codes as follows: 700 Hz, 900 Hz, 1100 Hz, 1300 Hz and 1500 Hz (the combination of any two of these frequencies correspond to a decimal figure); and (b) a control frequency at 1900 Hz. The servo signalling involves the establishment of a bilatoral connection between the sending signaller or transmitter in an exchange and the receiving signaller or receiver in another exchange.

Without going into the details of the mechanism of the information sent between the exchanges, it may be said that for the transmission of a figure or code the two frequencies transmitted from one side remain present line while the control frequency is not detected. The arrival of the control frequency stops the transmission of the code frequencies. On the other hand, this stopping of the code frequencies is detected, which stops the transmission of the control frequency. This stopping is detected, and the transmission of the next information item is sent. This form of signalling is especially used in the French telephone network.

Figure 1:
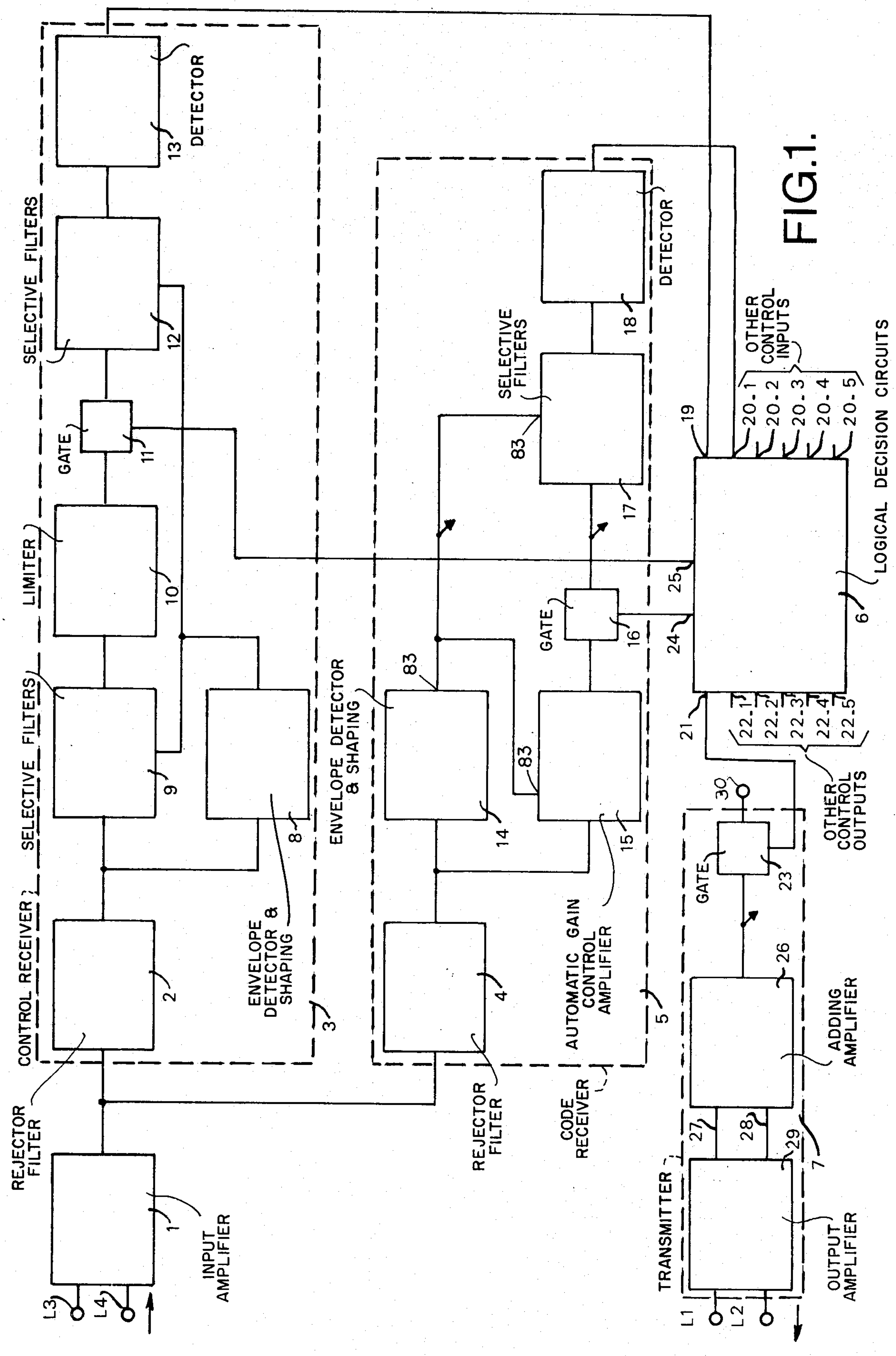
FIG. 1 shows a block diagram of a signaller which is for voice frequencies and which is according to the invention.

Referring to the drawings, now in detail, FIG. 1 shows a block diagram of a signaller with its pair of output terminals indicated by L1 and L2 and its pair of input terminals indicated by L3 and L4. An input amplifier 1 is connected to the input terminals L3 and L4, this amplifier being a differential amplifier. The output of amplifier 1 is connected, on the one hand, to an assembly of rejector filters 2 in the receiver branch 3 for the control frequency. The circuits of these filters are included in a control receiver rectangle 3, shown in broken lines. On the other hand, the amplifier is connected to an assembly of rejector filters 4 in the code receiver branch, for the code frequencies. The circuits of filters 4 are included in the code receiver rectangle 5 shown in broken lines.

The outputs of the two receiver branches 3 and 5 are connected to the inputs of a logical decision circuit 6. The control outputs of circuit 6 are connected on the one hand to the logical inputs of the branches 3 and 5 and on the other hand to logical inputs of the transmitter. The circuits of transmitter 7 are included in the rectangle 7 shown in broken lines. The transmitter 7 has its signal outputs of voice frequencies connected to the terminals L1 and L2.

In the control branch 3, the output of the assembly 2 is connected on the one hand to an envelope detector circuit and shaping circuit combination 8 and on the other hand to an assembly 9 of selective filters, one of which has its selectivity controlled. The output of the assembly 9 is connected to the input of a limiting circuit 10. The output of the circuit 10 is connected to the signal input of a logical gate 11. The output of the gate 11 is connected to an assembly 12 of selective filters, one of which has its selectivity controlled. The output of the circuit 8 is connected to the selectivity control inputs of the assemblies 9 and 12. The output of the assembly 12 is connected to the input of a detector 13.

In the branch 5, the output of the assembly 4 is connected on the one hand to an envelope detector circuit and shaping circuit combination shown at 14, and on the other hand to an automatic gain control amplifier 15. The output of the amplifier 15 is connected to the signal input of a logical gate 16. The output of circuit 14 is connected on the one hand to an input of the gain control circuit of the amplifier 15 and on the other hand to the selectivity control inputs of the assemblies such as 17. The output of the assembly 17 is connected to the input of the detector 18.

The assemblies 9 and 12 have their selective filters centered on the control frequency of 1900 Hz. Each assembly, such as 17, has its filters centered on one of the five code frequencies that is to say, 700 Hz, 900 Hz, 1100 Hz, 1300 Hz and 1500 Hz. The assembly 2 is composed of two rejector filters centered on the code frequencies nearest the control frequency, that is to say, 1500 Hz and 1300 Hz. The assembly 4 is composed of two rejector filters, both eliminating the control frequency of 1900 Hz.

The logic circuit 6 has an input 19 connected to the output of the detector 13 and five inputs 20.1 to 20.5 respectively connected to the outputs of the five detectors, such as 18. It has six outputs 21 and 22.1 to 22.5 connected to the control inputs of six logical gates such as 23. An output 24 is connected to the control input of the gate 16, and an output 25 is connected to the control input of the gate 11.

The transmitter 7 comprises the gates, such as 23, the outputs of which are applied in parallel to a circuit 26 comprising an adding amplifier having a polarity opposite to the output 28 of the reverser. The output circuit 29 of the transmitter 7 comprises two current amplifiers one of which has its input connected to the output 27 and its output to the wire L1. The other current amplifier has its input connected to the output 28 and its output to the wire L2.

The logical decision circuit 6 (which is of known construction deduces) from the signals applied to its input 19 and 20.1 to 20.5, the signalls which it is necessary to apply to its outlets. This circuit 6 likewise receives instructions from other circuits of the exchange, such as recorders. The expert would restore the operation of the circuit 6 according to the telephonic system used. There will not be described here the details of the circuit 6, but its operation will be given in a particular case in relation to the operation of the signaller.

In the description of the operation of the signaller of FIG. 1 which follows, it will first of all be assumed that it operates responsive to receipt of code frequencies. that is to say, a signal is applied from the circuit 6 to the gate 16, to render it active. On the contrary, the other gates 11 and 23 are blocked. Therefore, whatever the signal at the input of the signaller, one will not have any output signal of the detector 13 and no signal will be applied to the terminals L1 and L2.

The signal received at the terminals L3 and L4 is amplified in the amplifier. Then, it is applied on the one hand to the control receiver branch 3 on which it will have no action and on the other hand to the rejector filters 4 of the code receiver branch 5. The output signal of filters 4 is applied to the circuit 14 which detects the envelope of this signal normally formed by the pulsation of two voice frequencies and is rid of any interference at the control frequency. The wave shape of the signal applied to the circuit 14 is illustrated to the curve A of FIG. 14 where the conventional form of the pulsation of two relatively close frequencies can be recognised. At the output of the detector of 14 one has normally a rectangular signal as shown at B in FIG. 14, with steep leading and trailing edges. The block 14 shaping circuit (mounted at the output of the detector) has the effect of slowing the leading or rising edge, as, for example, by means of an integration of the signal. This shaping circuit preserves a steep trailing or rear face so as to obtain the shape of the signal illustrated by the curve C of FIG. 14.

The output signal of the rejector filters 4 is also applied to the input of the amplifier 15, which has for its object the amplification of this signal with as little distortion as possible. Since the input level of the signals may vary within wide limits the gain of amplifier 15 must be able to vary, and an automatic gain control circuit is provided. Normally this control circuit gives a raised gain to the amplifier, the level of the signal is weak. This condition is likewise realized in the absence of signal and at the commencement of the signal, whatever the level of this latter reaches in operation.

The start of a signal comprises a spectrum which is very rich in harmonics, with regard to the operating signal. The signal (rich in harmonics) applied to the assemblies of filters such as 17 could cause several filters to produce a resonance signal at a frequency which is different than the two voice frequencies of the operating signal. One would then have false signals at the output of the detectors such as 18. It is likewise known that the filters of rejector of 4 may give rise to resonances expressed at their outputs by short signals very rich in harmonics which are amplified strongly by the amplifier 15. In certain cases of operation of the logic circuit 6, the gate 16 is open, and these short signals are applied to the filters 17 causing false detections.

Figure 14:
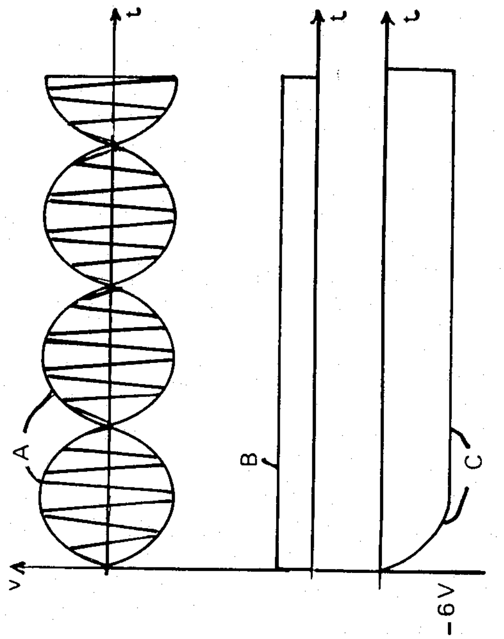
FIG. 14 shows the wave shape of signals at the entry of the envelope detector of FIG. 7 and at the output of the shaping circuit of the same FIG. 7.

To avoid these drawbacks, the gain control circuit of 15 is controlled by the output signal 14 so that in the absence of signal, the gain of amplifier 15 is minimum. At the commencement of a signal, this gain increases slowly. The curves B and C of FIG. 14 illustrate for a given signal level, the variation of the gain of the amplifier 15 without and with control by the output of circuit 14. One may conclude that in the second case the part of the signals which are rich in harmonics will not be transmitted to the filters 4 of code frequencies. At the end of the signal, the gain is rapidly brought to its minimum value.

The output signal of amplifier 15 is applied through the open gate 16 to the five assemblies of filters such as 17. These assemblies may comprise several selective filters in series at least one of which has its selectivity controlled. In fact, even if the automatic gain control circuit of the amplifier 15 has operated well, it is certain that the recognition of its frequency by each filter 4 must take time, after establishment of a signal. That is why a filter, with a variable selectivity capable of being controlled, is utilized.

When the selectivity is weak, the signal at the output of the filter 4 is very weak and in any case too weak to start the operation of the detector 18, which is preferably a threshold detector. When the selectivity is strong, the signal at the frequency of the filter leaves with a higher level while the signals of different frequencies are very much attenuated. The variable selectivity is obtained by an impedance which varies according to an applied voltage. In this embodiment of the invention, this voltage is that of the output signal of circuit 14, which increases slowly in absolute value.

Thus, in the absence of a signal, the value of the variable impedance is such that the selectivity is minimum while, once the signal is established, its value gives the filter its maximum selectivity. Consequently, at the start of the applied signal, the selectivity of the filter increases slowly from a minimum value to its maximum value.

The output signal of the assembly 17 is applied to the threshold detector 18 which fulfils several functions. Firstly, it establishes a starting detection threshold and a weaker end of detection threshold; it effects also the actual detection; finally it transforms the analog signal detected into a logic signal by the logic decision circuit 6.

It is known that a selective filter, once excited continues to resonate a rather long time after the applied signal has disappeared. Now, in the method of signalling provided in this embodiment, the code signals of voice frequencies may have variable durations according to the instant of detection of the control frequency in the starting signaller. This signalling, if it is certain, is relatively slow. There is, therefore, interest in ceasing the excitation of the detectors at the time of the end of the signals. According to the embodiment of the invention the output signal of the circuit 14, applied to the selectivity control of filters 17, reduces this selectivity at the end of the signal, thus preventing the filter from resonating, although the output of the detector is brought to zero when the signal ceases.

The recognition of a code signal is effected in the decision circuit 6, when two and only two detectors apply signals to the corresponding inputs of circuit 6. The circuit 6 then applies a signal on the output 21 which opens the gate 23. The input 30 of gate 23 is connected to a 1900 Hz generator, not shown. The control frequency is applied to the adding amplifier circuit 26 which applies a direct signal at its output 27 and a signal of opposite phase at its output 28. The two current amplifiers of the circuit 29 then apply the 1900 Hz signals opposite phases, to the output terminals L1 and L2 respectively.

In the starting signaller, the control frequency is detected, and the transmission of the code frequencies is cancelled. This detection of control frequency entails the end of the signal entering into the receiving branch 5 for the code frequencies. Therefore, there is a cancellation of the signals at the output of the two detectors 18. This cancellation is recognised in the circuit 6 which cancels the signal applied to the output 21, which stops the transmission of the control frequency.

The operation of the signaller of FIG. 1 will now be described assuming, that it operates as a transmitter of code frequencies. That is to say, the circuit 6 applies a signal to the gate 11 to render it active. The gate 16 is blocked and logic signals corresponding to the figure to be transmitted are applied to two of the outputs 22.1 to 22.5.

Two gates 23 corresponding to the two excited outputs 22 are rendered active. Each gate has its signal input connected to a generator, not shown, of voice frequency. Two frequencies are applied to the adding amplifier circuit 26 which applies a direct complex signal at 27 and an opposite phase signal at 28. The two current amplifiers of the circuit 29 then apply the complex signal of the two voice frequencies, with opposite phases, to the outlet terminals L1 and L2.

At the end of a certain time, the frequencies transmitted are detected in the arrival signaller, which sends back a signal at the control frequency of 1900 Hz. The control signal is received at the terminals L3 and L4, are amplified in the amplifier 1, then applied to the rejector filters 2 of the control receiver branch 3 and to the rejector filters 4 of the code receiver branch 5 in which latter branch there will be no response. The rejector filters 2 are necessary because of the path is with two wires. Therefore, the code receiver branch 3 also receives the signals transmitted by output amplifier 29. The filters 2 are tuned to eliminate the frequencies nearest 1900 Hz, that is to say 1500 Hz and 1300 Hz.

The signal then passes into an assembly of more selective filters 9 which eliminate the interference noise which has passed the filters 2 and in particular the harmonics obstructing the voice freqencies. On the other hand, the output signal of the filters 2 is applied to the envelope detector and shaping circuit 8, which fulfils the same role as the circuit 14 with regard to the filters 17.

The output signal of circuit 8, which has a form similar to that which leaves circuit 14 and controls the selectivity of two assemblies 9 and 12. The output signal of filters 9 passes into a limiter amplifier 10. In fact, as in the code receiver branch 3, only a single frequency is to be recognised, thus the signal may be limited. This was not the case for the two frequency signals of the code receiver branch 5.

The gate 11 being open, the signal passes again into an assembly of selective filters 12 identical to assembly 9 and also controlled in selectivity by circuit 8. Finally, the output signal of assembly 12 is detected in a threshold detector 13 which is identical to the detectors 18 of the branch 5. There, the output of detector 13 is a signal which is applied to the input 19 of the circuit 6. This causes the stopping of the transmission of the code frequencies, cancelling the signals on the two outputs of 22.1 to 22.5.

The arrival signal detects the stopping of the code signal and cancels the transmission of the control frequency. The circuit 8 selectivity control of assemblies 9 and 12 rapidly drives the detector 13 to zero output. A new cycle can then recommence unless the logic circuit 6 sequence is changed.

The circuits used in the signaller of FIG. 1 will now be described in more detail.

Figure 2:
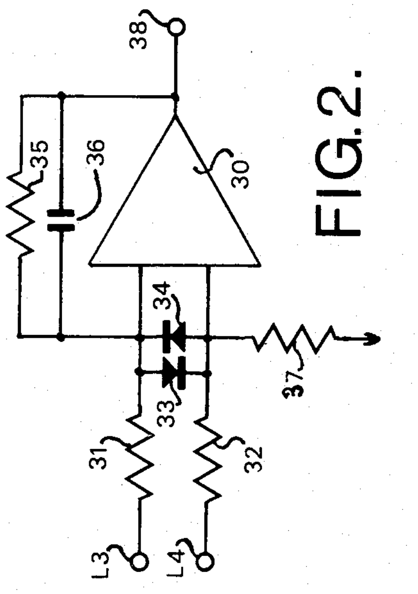
FIG. 2 shows a detailed diagram of a differential amplifier of the signal receiver of FIG. 1.

FIG. 2 shows the circuit forming the input amplifier 1 (FIG. 1) which comprises essentially an operational amplifier 30 mounted as a conventional subtractor with the signals at terminals L3 and L4 applied respectively to the negative and positive input terminals of amplifier 30, through the input resistances 31 and 32. Between the two input terminals of amplifier 30 are two limiting diodes 33 and 34. Between the output of amplifier 30 and its negative input are mounted the conventional reaction resistance 35 and a condenser 36 adapted to ensure the stability of the amplifier, the condenser being of small value. The positive input of amplifier 30 is connected to a potential of − 6V via a resistance 37. The output signal of amplifier 30 is applied to the terminal 38.

Figure 3:
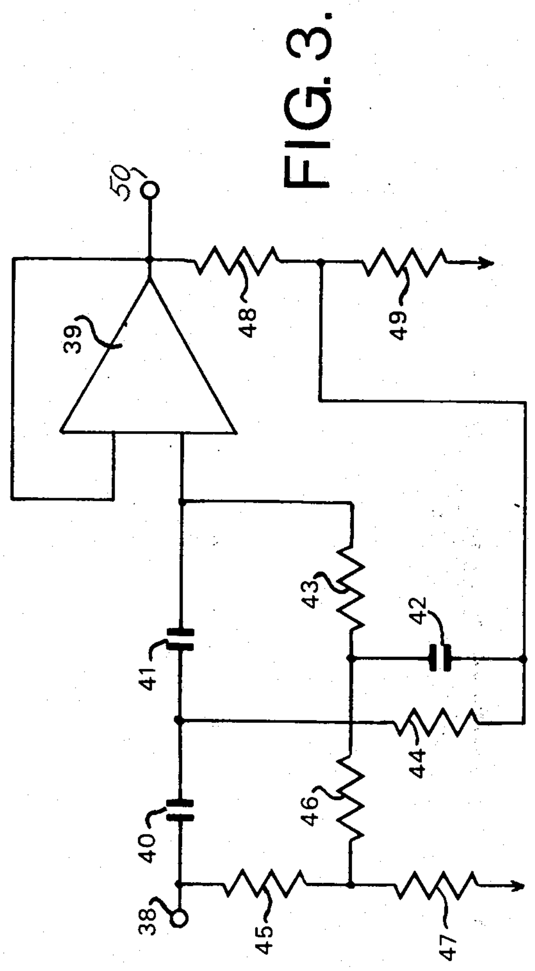
FIG. 3 shows a detailed diagram of a rejector filter of the signaller of FIG. 1.

FIG. 3 shows a rejector filter of the assembly 2 which may comprise, in series, two such rejector filters tuned to two different frequencies, in this case 1500 Hz and 1300 Hz. The rejector filter shown comprises essentially an operational amplifier 39 with a double T cell of the same type as that described on pages 214 and following of the book "L'amplificateur operational et ses applications" (The operational amplifier and its application) by J. C. Marchais, Edition Masson et Cie. The double T cell comprises the three conventional condensers 40, 41 and 42 the last of which is of a value double that of the two others, and two conventional resistances 43 and 44. The third resistance is replaced by a voltage divider mounting constituted by the three resistances 45, 46 and 47. The values of these components are selected not only to reject the frequency of 1500 or 1300 Hz but to favour the high frequencies so as not to attenuate the control frequency at 1900 Hz, which must be detected in the branch 3. Another voltage divider bridge of two resistances 48 and 49 permits the regulating of the reaction. The outlet of amplifier 39 is connected to the output terminal 50.

Figure 4:
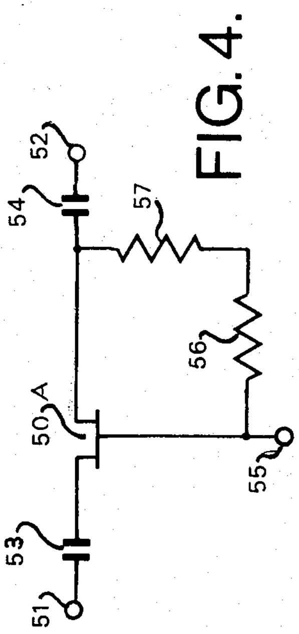
FIG. 4 shows a logical input signal gate utilised in the signaller of FIG. 1.

FIG. 4 shows the circuit of a gate, such as the gates 11, 16 or 23 (FIG. 1) comprising a field effect transistor 50A with the drain-source circuit coupled to the input and output terminals 51, 52 by two condensors 53 and 54. The input control terminal 55 is connected directly to the gate of transistor 50A. A polarisation of + 5V is applied to the gate by a resistance 56 and to the drain by a resistance 57.

Figure 5:
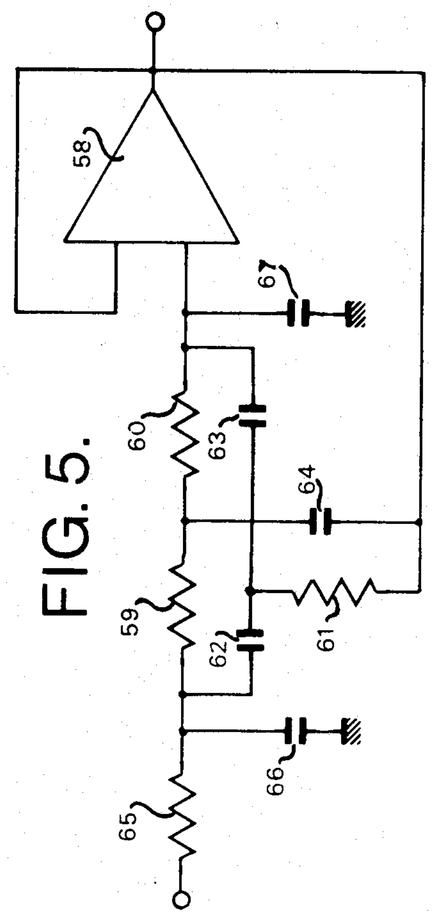
FIG. 5 shows a detailed diagram of another rejector filter of the signaller of FIG. 1.

FIG. 5 shows a rejector filter of the assembly 4 which may comprise in series two such filters tuned to the control frequency of 1900 Hz. The rejector filter shown comprises essentially an operational amplifier 58 with a double T cell of the same type as illustrated in the book quoted above, and comprising the three resistors 59, 60 and 61 and the three condensors 62, 63 and 64. This cell is preceded by a filter formed by the resistance 65 and the condenser 66 for attenuating the band of the control frequency and transmitting the band of the code frequencies. The cell is in front of the positive input of amplifier 58 and followed by a condenser 67 which equalises the response curve in the band of the code frequencies.

Figures 6, 7, 8, 11:
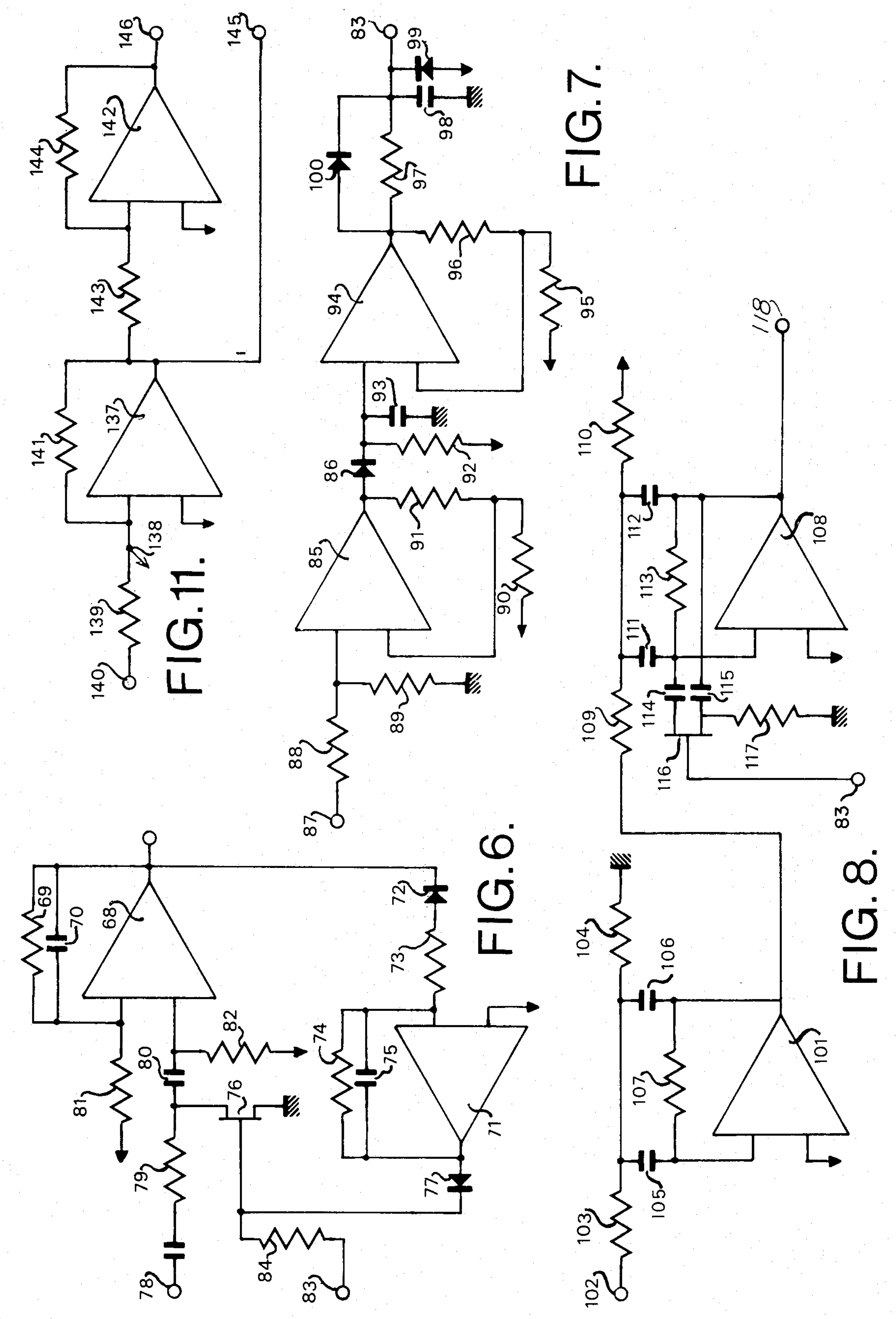
FIG. 6 shows a detailed diagram of an automatic gain control amplifier of the signal receiver of FIG. 1.
FIG. 7 shows a detailed diagram of an envelope signal detector and of a shaping circuit of the signal receiver of FIG. 1.
FIG. 8 shows a detailed diagram of an assembly of two selective filters in series, one of which has controlled selectivity, in the signal receiver of FIG. 1.
FIG. 11 shows a detailed diagram of an adder amplifier and a reverser utilized in the signal transmitter of FIG. 1.

FIG. 6 shows details of the automatic gain control amplifier 15 (FIG. 1) which amplifier comprises essentially of an an operational amplifier 68, the output of which is connected to its input by a reaction resistance 69 and a stabilisation condenser 70. On the other hand, the output of 68 is connected to the input of an amplifier 71 by a detection diode 72 and a resistance 73. The positive input of amplifier 71 is connected to a fixed potential of − 6V. The output of amplifier 71 is connected to its input by a reaction resistance 74 and an integration condenser 75. The output of amplifier 71 is also connected to the gate of a field effect transistor 76 by means of a decoupling diode 77. The input signal terminal 78 is followed by a continuous coupling condenser and a resistance 79 followed by another continuous coupling condenser 80 connected to the positive input amplifier 68. The continuous positive and negative input potentials of amplifier 71 are determined by the resistances 81 and 82, both connected to a potential of − 6V. The drain-source circuit of the field effect transistor 76 is connected between the junction of resistance 79 and capacitor 80 and earth.

Normally, the operation of this automatic gain control circuit is as follows. The field effect transistor 76 is utilized as an attenuator controlled by a voltage shunting to earth a part of the current passing through the resistance 79.

In the absence of a signal applied to the terminal 78, no signal is detected by the assembly of 72, 71 and 77 and transistor 76 is blocked, ensuring no attenuation. When the signal at the output of amplifier 68 has passed a certain threshold, transistor 76 is unblocked, and it commences to attenuate the signal at the positive inlet of amplifier 68. Then transistor 76 maintains the output level of the signal at a predetermined value.

This circuit (FIG. 6) has the disadvantage that the start of a signal is very rich in harmonics as it passes integrally through the amplifier. That is why there is provided a control input terminal 83 likewise connected to the gate of transistor 76, which keeps transistor 76 unblocked in the absence of signal when the signal shaped as shown in FIG. 14 is applied to it. A resistance 84 is provided between terminal 83 and the grid of transistor 76.

FIG. 7 shows the diagram of the envelope detector and shaping circuit combination 14 of FIG. 1. The envelope detector comprises essentially an operational amplifier 85 mounted as a voltage comparator. The outlet current of amplifier 85 is rectified by a diode 86. The negative input circuit of amplifier 85 comprises the input signal terminal 87 and the resistance 88, the input being further connected to earth by the resistance 89. The positive input of amplifier 85 is connected to a potential of −67V via the resistance 90 and to the output of amplifier 85, via the resistance of reaction 91. The circuit of the diode 86 is completed by the resistance 92 connected to a source of potential of 12V.

The signal rectified by diode 86 is filtered by the condenser 93 to earth, before being applied to the shaping circuit which comprises essentially an operational amplifier 94 mounted as a source of current. Its positive input is connected to a source of potential of − 12V via the resistance 95 and to the output of amplifier 94 via the reaction resistance 96. At the output of amplifier 94 is mounted an RC circuit integrator comprising the resistance 97 and the condenser 98 connected to earth. A coupling diode 99 is connected to the potential of − 6V and serves to limit the voltage of the output signal of the integrator to 6V. The resistance 97 is shunted by a diode 100, the polarity of which is such that is discharges the condenser 98 after the end of application of the signal rectified by diode 86 at the negative input of amplifier 94. The output signal of the shaping circuit is applied to the terminal 83.

FIG. 8 shows an assembly of two selective filters in series, such as 9, 12 or 17 in FIG. 1. The two filters are of the type of that shown in FIG. VIII 39, page 224 of the book mentioned herein. The first filter comprises essentially the operational amplifier 101 and a reaction network connected between the input signal terminal 102 and earth. This reaction network comprises a resistance 103, a resistance 104, the two condensers 105 and 106, and a resistance 107. The junction between condenser 105 and resistance 107 is connected to the negative input of amplifier 101. The junction between condenser 106 and resistance 107 is connected to the output of amplifier 101.

The operation of this filter is described in the book quoted above and it is unnecessary here to revert to it.

The second filter is, in a similar manner composed, of an operational amplifier 108 and a reaction network connected between the output of amplifier 101 and a potential of − 6V. This network comprises a resistance 109, a resistance 110, two condensers 111 and 112 and a resistance 113. The junction of condenser 111 and resistance 113 is connected to the negative input of amplifier 108. The junction of condenser 112 and resistance 113 is connected to the output of amplifier 108. However, in the second filter, the condensers 114 and 115 serve only to separate the continuous current. The resistance 113 is in parallel with a field effect transistor 116, or more exactly in parallel with the drain-source circuit of transistor 116. The gate of field effect transistor 116 is connected to the input terminal 83 to receive the control signal originating from the shaping circuit of FIG. 7. With such an arrangement, the resistance 113 behaves as if it were variable with the consequence that the filter has, variable selectivity as well as a frequency of variable resonance, which has importance in view of the first filter being centered correctly. The source of transistor 116 is connected to earth via a resistance 117. The output signal of amplifier 108 is applied to the terminal 118.

Figure 9:
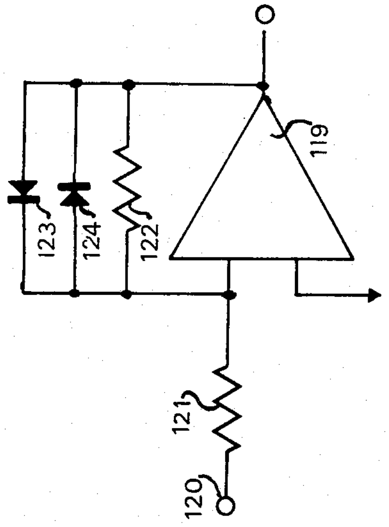
FIG. 9 shows a detailed diagram of a limitor utilized in the receiving branch of the receiver of FIG. 1.

FIG. 9 shows a limiting amplifier utilizible at block 10 in FIG. 1. It comprises essentially an operational amplifier 119, the input of which is connected to the input terminal 120 via a resistance 121. The output of amplifier 119 is connected to this input by a reaction network comprising in parallel a resistance 122 and two diodes of opposite polarity 123 and 124. The operation of this limiting circuit is explained in the book mentioned above in connection with FIG. V.23, page 78.

Figure 10:
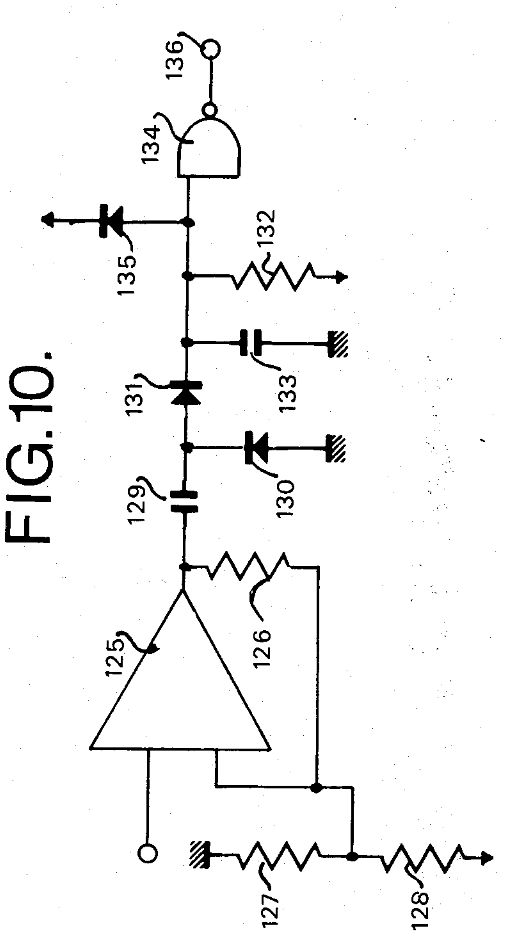
FIG. 10 shows a detailed diagram of a detector utilized in the signal receiver of FIG. 1.

FIG. 10 shows a detector such as block 13 or 18 of FIG. 1. It comprises in series an amplifier behaving as a threshold detector, a detection circuit and a logical level output circuit. The amplifier comprises essentially an operational amplifier 125, a reaction resistance 126 and a voltage divider formed by two resistances in series 127 and 128. The condenser 129 couples the output of the amplifier to the detection circuit which comprises a restoring diode 130, a rectifying diode 131. A filter formed by the resistance 132 and the condenser 133 and the diode 131 are connected to the input of the logic circuit formed by a starting circuit 134. The circuit 134 may be a commercial circuit such as a circuit 7413 in the catalogue of the American Company, Texas Instruments. It deelivers a zero signal corresponding to the state 0 when a signal greater than 1.6V is applied to and a signal of + 5V corresponding to the state 1 when a signal less than 0.8V is applied to the input. This feature of two thresholds (the starting one of which is greater than the one returning it to zero) is important because it avoids any returns to zero due to the oscillations around the high level of the signal. A protection diode 135 connected to the potential of +5V, is provided to avoid the application of signals of more than 5V to the circuit 134. The output terminal 136 is connected to a corresponding input of the logic decision circuit 6.

FIG. 11 shows the adder amplifier and reverser combination of the block diagram circuit 26 of FIG. 1. The adder amplifier comprises an operational amplifier 137. The negative input of amplifier 137 is connected to a multiterminal 138 to which are joined in parallel several resistances such as 139. The other terminal 140 of each resistance constitutes the input terminal to which is applied the output signal of a gate 23 FIG. 1. Such an adder is of the type of those described in the book mentioned above on pages 66 and following pages. It includes a reaction resistance 141. The reverser comprises an operational amplifier 142, a reaction resistance 144 and an input resistance 143 to which is applied the output signal of amplifier 137. Thus, the output terminals 145 is directly connected to the output of amplifier 137 and terminals 146 is connected to the output of amplifier 142, to deliver signals in phase opposition.

Figure 12:
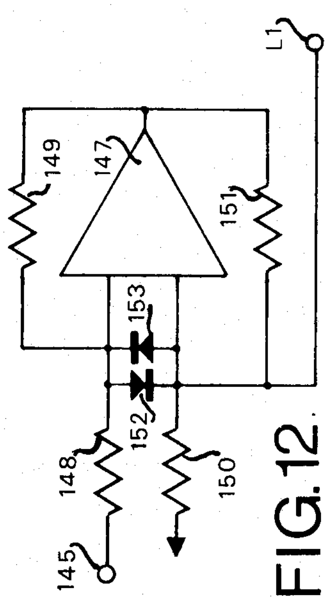
FIG. 12 shows a detailed diagram of an amplifier source of current utilized in the signal transmitter of FIG. 1.

FIG. 12 shows an amplifier source of the constant current circuit (i.e. the constant current circuit 29) of FIG. 1. It comprises an operational amplifier 147 mounted according to the diagram shown in the book mentioned above on page 76, FIG. V.21. The negative input of amplifier 147 is connected to the input terminal 145, for example, by way of a resistance 148 and to the output of 147 by way of a resistance 149 ensuring a reaction. The positive input of amplifier 147 is connected to a potential of − 6V via a resistance 150 and to the output of amplifier 147 via a resistance 151, thus ensuring another part of the reaction. Between the positive and negative inputs of amplifier 147 are oppositely connected limiting diodes 152 and 153. The positive terminal is connected directly to the terminal L1, for example. The line connected to terminal L1 constitutes the charge in which passes a current independent of its characteristics which is very important for the efficiency of the signaller.

Figure 13:
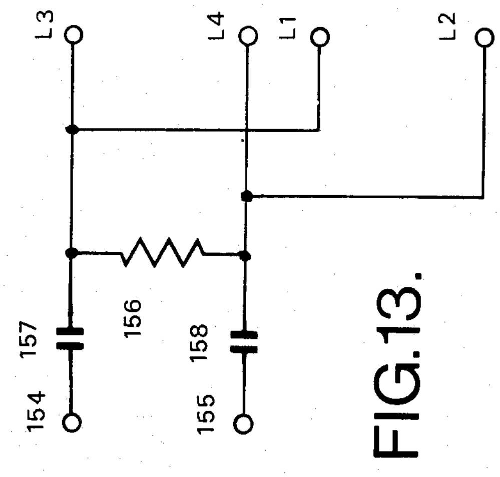
FIG. 13 shows a diagram of a two-wire connection circuit for the signaller of FIG. 1.

FIG. 13 shows a junction circuit at the output terminals L1 and L2 and the input terminals L3 and L4 of the signaller. This junction circuit may be used to connect a line with two wires 154 and 155 to the signaller of the other telephone exchange. Terminals L1 and L3 are connected together and terminals L2 and L4 are connected together. Between their connection points there is mounted a resistance 156 of 600 ohms, two continuous separation condensers 157 and 158 being provided between the terminals of resistor 156 and the two wire line 154 and 155. It is understood that in this case and after the inlet circuit 1, rejector filters must be provided in the branches 3 and 5 of the receiver of the signaller.

FIG. 14 shows the shapes of waves intended to explain the role of the shape detector and shaping circuit 14. At the input terminal 87, FIG. 7 there is a pulsation signal of two code frequencies such as that shown in A. At the negative output of amplifier 94 that is, after detection of the envelope of the signal of the curve A and amplification, there is a substantially rectangular signal of the curve B. After passage of this signal amplified by amplifier 94 through the circuit RC 97 and 98, the commencement of the reversed signal of the curve C is obtained. At the end of the signal the diode 100 ensures a steep trailing edge of the signal. As has been seen above, the signal conforming to the curve C, serves for the control of the gain of the amplifier 68 of FIG. 6, in being applied to the terminal 83. The same signal is also used to control the selectivity of the filter of FIG. 8 in being applied to the terminal 78.

As the description has shown, the assembly of the signaller may be constructed by means of analog integral circuits in the form of operational amplifiers and resistances which gives it an extremely good viability and a very much reduced space requirement.

Although the principles of the present invention have been described above in relation to a particular embodiment, it must be understood that the description has been made only by way of example and does not limit the scope of the invention.

What we claim is:

1. A multifrequency signalling receiver comprising a plurality of selective filter means, each selective filter having controlled selectivity tuned to a corresponding one of the signalling frequencies received by the multifrequency receiver, signal envelope detector means coupled with each filter and including a signal envelope detector circuit followed by a shaping circuit for giving a slowly changing leading edge to the output signal from said signal envelope detector means, means for substantially simultaneously applying the input signal received by said signalling receiver to the selective filters and to the said signal envelope detector means, means for applying the output signal of said shaping circuit to control the selectivity of the said filters so that a maximum selectivity is attained in each of the filters only when the output signal of the shaping circuit has reached a predetermined amplitude, and decision circuit means for giving an output signal when the output of said receiver coincides with a recognized code.

2. A signalling receiver according to claim 1 wherein said shaping circuit includes means for giving the output signal of said signal contour detector means a steeply changing trailing edge.

3. A signalling receiver according to claim 1, wherein said selective filters are active band filters including a plurality of resistances with two feedback circuits, one of the resistances of the feed back circuits being variable and comprising in parallel a fixed resistance having a value which tunes the filter to its maximum selectivity and the drain-source circuit of a field effect transistor, the gate of which is connected to the output of said shaping circuit, and means responsive to an absence of a wave shaping circuit output signal for providing practically no resistance in said drain-source circuit and responsive to an appearance of said wave shaping circuit output signal for providing a very large resistance at the drain-source circuit.

4. A signalling receiver according to claim 1, wherein said selective filters comprise at least two band filters in series, the first of said filters having at least a fixed selectivity centered on a predetermined frequency and the latter of said filters having at least one controlled selectivity which when it operates with its total selectivity is likewise centered on the said predetermined frequency.

5. A multifrequency signal receiver comprising: automatic gain controlled amplifier means, rejector filters coupled between the input of said receiver and said amplifier means to eliminate undesirable frequencies, a plurality of selective filters each having a controlled selectivity tuned to one of the signal frequencies, a signal envelope detector circuit means followed by a shaping circuit means for giving to the outlet signal of the said signal envelope detector a slowly changing leading edge, means for applying the output signal of the said rejector filters in parallel to the said automatic gain control amplifier means and to the signal envelope detector circuit means, said shaping circuit giving a slowly changing leading edge to said signal envelope, means for applying the output signal of said shaping circuit to said gain control amplifier means to control said amplifier so that it is operating at its fixed gain once the said output signal of said shaping circuit has reached its maximum amplitude in absolute value, the gain of said amplifier being minimum in the absence of signal and means responsive to the output of said receiver for indicating apparently valid signals.

6. A signalling receiver according to claim 5, wherein said automatic gain control amplifier means includes a variable resistance mounted in a parallel circuit for applying part of a signal from said rejector filters to the input of the automatic gain control amplifier, means for controlling the value of said resistance by a conventional automatic gain control circuit responsive to the level of the output signal of the said amplifier and by the output signal of the said shaping circuit.

7. A multifrequency signalling receiver according to claim 6 and a field effect transistor having a source, drain and gate, said variable resistance element being the source-drain circuit of said field effect transistor, and means for applying to the gate the sum of said automatic gain control circuit signal and said shaping circuit output signal.

8. A signalling receiver according to claim 5 and means jointly responsive to said signal envelope detector circuit means and said shaping circuit for controlling the automatic gain control amplifier.

9. A signalling receiver according to claim 5 wherein said input of said receiver comprises a differential operational amplifier including means for connecting the inputs of the differential amplifier to a two wire communication line, and including a signal transmitter means responsive to the output of the means for indicating valid signals wherein its output circuit comprises two operational amplifiers functioning as current amplifiers and the outputs of which are connected respectively to the two wires, the signals applied to the two current amplifiers being in phase opposition.

10. A multifrequency signalling receiver comprising at least one selective filter means having controlled selectivity tuned to a corresponding one of the signalling frequencies received by the multifrequency receiver, signal envelope detector means coupled with said filter and including a signal envelope detector circuit followed by a shaping circuit for giving a slowly changing leading edge to the output signal from said signal envelope detector means, means for substantially simultaneously applying the input signal received by said signalling receiver to the selective filter means and to the said signal envelope detector means, means for applying the output signal of said shaping circuit to control the selectivity of the said filter means so that a maximum selectivity is attained in the filter only when the output signal of the shaping circuit has reached a predetermined amplitude, and decision circuit means for giving an output signal when the output of said receiver coincides with a recognized code.

* * * * *

UNITED STATES PATENT OFFICE

CERTIFICATE OF CORRECTION

PATENT NO. : 3,909,549

DATED : September 30, 1975

INVENTOR(S) : Andre Tarridec and Jean Leon Marie Joubert

It is certified that error appears in the above-identified patent and that said Letters Patent are hereby corrected as shown below:

In the Abstract, line 2, delete "selective"; line 3, after "Each" insert --selective--; Col. 3, line 18, after "the" delete --said--; Col. 4, line 8, change "on" to --one--; Col. 5, line 19, change "2-among-5 and" to --2 among 5 code and--; line 33, at the beginning of the line, add --on the--; Col. 5, line 61, after "ter" insert --7--; Col. 7, line 48 after "of" insert --amplifier--; after "signal" insert --of circuit--; Col. 8, line 54, after "nals" insert --with--; line 58, change "83" to --78--.

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*